United States Patent [19]

Ashkin et al.

[11] Patent Number: 4,630,890
[45] Date of Patent: Dec. 23, 1986

[54] EXPOSED CORE OPTICAL FIBERS, AND METHOD OF MAKING SAME

[75] Inventors: Arthur Ashkin; Rogers H. Stolen, both of Rumson, N.J.

[73] Assignee: AT&T Bell Laboratories, Murray Hill, N.J.

[21] Appl. No.: 506,594

[22] Filed: Jun. 22, 1983

[51] Int. Cl.[4] ............................................... G02B 6/16
[52] U.S. Cl. ............................... 350/96.30; 65/3.11; 350/96.33
[58] Field of Search .............................. 65/3.11, 3.1; 350/96.15, 96.30, 96.33

[56] References Cited

U.S. PATENT DOCUMENTS

| | | | |
|---|---|---|---|
| 3,891,302 | 6/1975 | Dabby et al. | 350/96.3 |
| 4,179,189 | 12/1979 | Kaminow et al. | 350/96.33 |
| 4,274,854 | 6/1981 | Pleibel et al. | 65/2 |
| 4,315,666 | 2/1982 | Hicks, Jr. | 350/96.15 |
| 4,343,532 | 8/1982 | Palmer | 350/96.19 |
| 4,493,528 | 1/1985 | Shaw et al. | 350/320 X |

FOREIGN PATENT DOCUMENTS

2005046  4/1979  United Kingdom ............. 350/96.15

OTHER PUBLICATIONS

Schöner et al., "Novel Method for Making Single-Mode Optical Fibre Directional Couplers", *Electronics Letters*, Jun. 24, 1982, vol. 18, No. 13, pp. 566–568.
Schiffner et al., "Double-Core Single-Mode Optical Fiber as Directional Coupler," *Applied Physics*, 23, pp. 41–45 (1980).
Matsuo, "Selective Etching . . . by CBr F3 Plasma", Applied Physics Letters, vol. 36, No. 9, May 1, 1980, pp. 768–770.
Kapany et al, "Coherent Interactions between Optical Waveguides and Lasers", Journal of the Optical Society of America, Sep. 1968, vol. 58, No. 9, pp. 1176–1178.
Simpson et al., *IEEE Journal of Lightwave Technology*, vol. 1, Issue 2, p. 370, 1983.
R. D. Birch et al., "Fabrication of Polarisation-Maintaining Fibres Using Gas-Phase Etching", *Electronics Letters*, vol. 18, No. 24, Nov. 25, 1982, pp. 1036–1038.
Hosaka et al., "Single-Mode Fiber-Type Polarizer", *IEEE J. Quantum Electronics*, vol. QE-18, No. 10, Oct. 1982, pp. 1569–1572.
Ippen et al., "Evanescent Field Pumped Dye Lasers", *Applied Physics Letters*, vol. 21, No. 7, p. 301, Oct. 1972.

*Primary Examiner*—John Lee
*Assistant Examiner*—Lester Rushin, III
*Attorney, Agent, or Firm*—Eugen E. Pacher

[57] ABSTRACT

The invention provides a method for making an optical fiber with a uniformly thin section of cladding. A preform having a core and at least one cladding layer is first made. The preform is prepared by cutting the preform so that the core is close to the surface of the preform. An optical fiber is pulled from the cut preform so the core is close to the surface of the optical fiber. The fiber may have cladding further removed by etching. A material selective etch may be used to make a protruding core fiber. Etching may be done on the preform before pulling the fiber.

16 Claims, 7 Drawing Figures

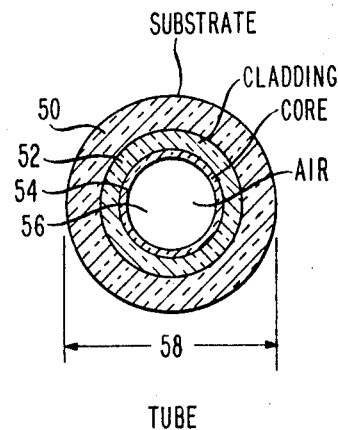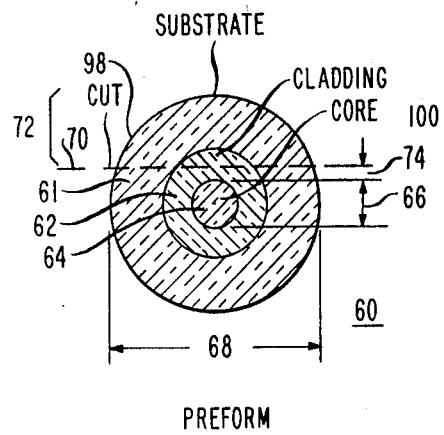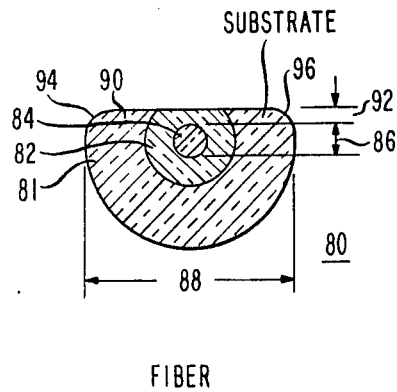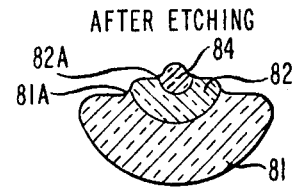

EXPOSED CORE OPTICAL FIBERS, AND METHOD OF MAKING SAME

FIELD OF THE INVENTION

This invention relates to optical fibers and, more particularly, to optical fibers which provide evanescent field coupling.

BACKGROUND OF THE INVENTION

Evanescent field coupling into or out of an optical fiber has been done by placing a receiving core within the evanescent field of a sending core. In one approach, a fiber contaning two cores within a single cladding and substrate has been made. The fiber containing two cores was made by cutting a planar section from a preform and fusing two such cut preforms along the cut plane. The fused preform has two cores, and the cores in the fiber pulled from the cut preform transfer energy from one to the other because each lies in the evanescent field of the other. See Schiffner et al., "Double Core Single Mode Optical Fiber as Directional Coupler", *Applied Physics*, Vol. 23, p. 41, 1980.

Other approaches to obtaining evanescent field coupling include first pulling a fiber and then thinning the cladding by polishing or etching. A thin region of cladding then provides a path for the optical signal to couple into an adjacent medium by overlap of the evanescent field with the adjacent medium.

A problem which limits the usefulness of the technique of making a fiber containing two cores is the difficulty of coupling two separate single mode fibers to the double core fiber. The difficulty arises because the two cores are separated in the double core fiber by only a few microns.

A problem which limits the usefulness of the technique of first pulling the fiber and then thinning the cladding by polishing or etching is the difficulty of making a uniformly thin residual layer of cladding. In making an evanescent field coupler between two fibers, it is desirable to have uniformly thin regions of cladding on both fibers in order to achieve predictable coupling. The difficulty in polishing arises because optical fibers are small, on the order of 100 microns outside diameter and with a core which may be as small as 3 microns diameter, and polishing away cladding in order to leave a residual uniform thickness of a few times the core diameter is a severe constraint on polishing. Etching has been done by first twisting the fibers, then etching the twisted fibers, and finally encapsulating the etched fibers, and this approach makes fragile fibers with limited means for adjustment of the coupling.

SUMMARY OF THE INVENTION

The present invention provides an optical fiber with a uniformly thin section of cladding. A preform having a core and at least one cladding layer is first made. The preform is prepared by, for example, cutting away a portion of the preform so that the core is close to the surface of the preform. An optical fiber is then pulled from the cut preform. The resultant fiber has a core which is close to the surface of the fiber. The thickness of the cladding between the chord and the core is substantially uniform for lengths of fiber not heretofore achieved.

BRIEF DESCRIPTION OF THE DRAWINGS

FIG. 1 shows a cross section of a substrate tube and deposited layers;

FIG. 2 shows a cross section of a preform for an optical fiber including a cut which gives the preform a cross section with an arc and a chord;

FIG. 3 shows a cross section of an optical fiber pulled from the preform of FIG. 2;

FIG. 4 shows a cross section of a preform or of an optical fiber after etching;

DESCRIPTION OF THE PREFERRED EMBODIMENT

Figure 5:
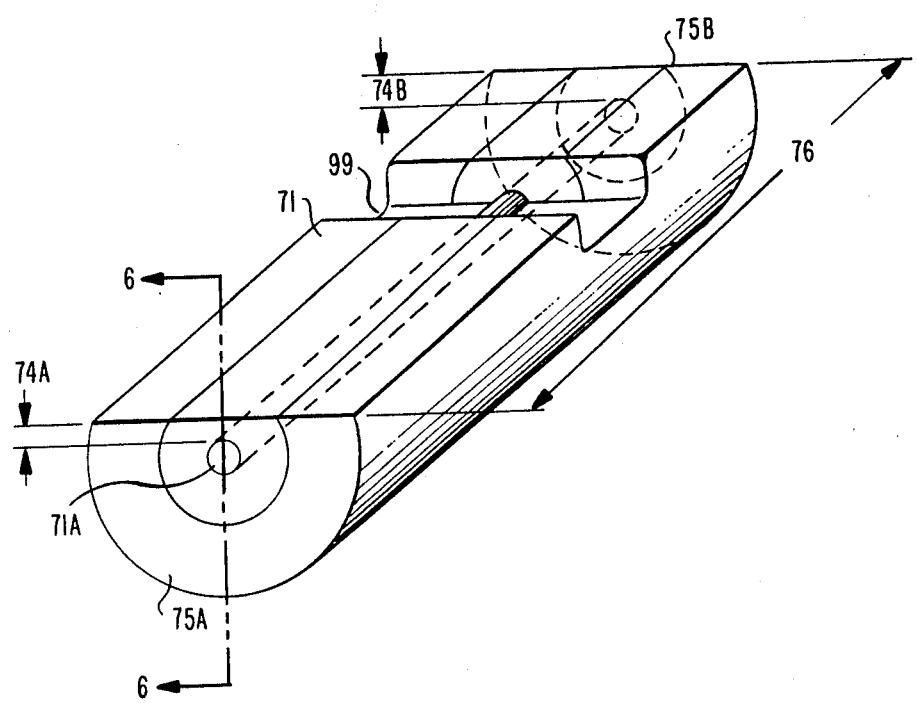
FIG. 5 is an isometric schematic view of a cut preform or of the fiber pulled from a cut preform.

An optical fiber may be made by first making a glass tube substrate and depositing layer of cladding material and core material inside the tube. Referring to FIG. 1, there is shown a glass tube 50 which forms a substrate. A layer 52 of cladding material is shown. A layer 54 of core material is shown inside of the layer 52 of cladding material. Additional layers (not shown) of cladding material could be used, but only one such layer is shown for purposes of illustration. The interior 56 of the core 54 contains air. The diameter of tube 50 is designated 58.

Tube 50 is collapsed to become preform 60 by heating tube 50 to a high temperature. Preform 60 is illustrated in FIG. 2. Tube 50 becomes preform substrate layer 61. Cladding layer 62 becomes preform cladding layer 62. Core layer 54 becomes preform core layer 64. Preform core layer 64 has a substantially solid cylindrical shape because the air is removed from interior 56 during the collapsing process. The diameter of preform core layer 64 is designated as diameter 66. Diameter 58 of tube 50 collapses to become preform diameter 68. The diameter 58 of tube 50 is reduced by a factor of approximately 1.5 to 2 during the collapsing process. For example, a tube with diameter 58 of 14 mm and with a 2 mm wall thickness may collapse to a preform diameter 68 of approximately 10 mm.

Figure 6:
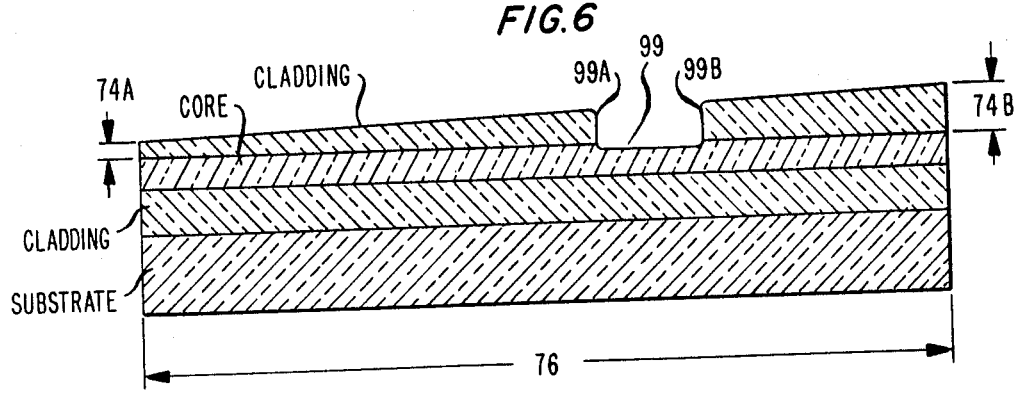
FIG. 6 is a sectional view of section 6 of FIG. 5.

A section of the preform is removed along a cut line designated 70. Cut line 70 indicates a cut of preform 60 along a plane chosen at a predetermined angle to the axis of preform 60. Referring to FIG. 5, the plane of cut 70 is designated 71. Plane 71 may be chosen to lie parallel to the axis 71A of preform 60. Or, alternatively, plane 71 may be chosen so as to intercept the axis 71A of preform 60. The interception point (not shown) may lie beyond either end of preform 60. The portion 72 of preform 60 is removed and discarded. Portion 72 of preform 60 may be removed by, for example, grinding or polishing preform 60. The cladding thickness along a radius draw perpendicular to cut line 70 is designated 74. Referring to FIG. 5, the thickness 74 is shown at end 75A of the preform as thickness 74A, and at end 75B of the preform as thickness 74B. When plane 71 of the cut is made substantially parallel to the axis 71A of the preform, then thickness 74A and thickness 74B are substantially equal in value. Alternatively, when the plane 71 of the cut is made to intercept the axis 71A of the preform, then the thicknesses 74A and 74B are different in value. As a typical numerical example, the core diameter is 8.5 mm, the thickness 74A is 0.01 mm, the thickness 74B is 1 mm, and plane 71 intersects axis 71A to the left of end 75A of the preform. FIG. 6 is a sectional view taken along section 6 of FIG. 5, and shows the thickness 74 of cladding layer 62 as it varies from narrow thickness 74A to a greater thickness 74B. It is convenient to express the thicknesses 74, 74A, 74B in terms of the diameter 66 of the preform core layer 64, as shown in FIG. 2. Thicknesses 74, 74A, 74B will typically be chosen to lie between less than, to a few times greater than, the diameter 66 of preform core layer 64.

An optical fiber 80 is pulled from preform 60. FIG. 3 illustrates a cross section of optical fiber 80. Fiber substrate layer 81 is formed from preform substrate layer 61. Fiber cladding layer 82 is formed from preform cladding layer 62. Fiber core 84 is formed from preform core layer 64. Fiber core 84 has a diameter designated 86. Fiber substrate 81 has an outside diameter designated 88. Fiber diameter 88 is typically 110 microns for fibers used in telecommunications applications.

Fiber 80 has a relatively flat portion 90 which results from cut 70 made on preform 60. Flat portion 90 has a minimum distance 92 from fiber core 84. FIG. 5 is an isometric view which may be regarded as showing both a cut preform and the optical fiber pulled from the preform. FIG. 6 is a view of section 6 of FIG. 5, and so may also refer either to the preform 60 or to the optical fiber 80. Length 76 for a preform may typically be between 10 cm and 20 cm. However, for an optical fiber pulled from the preform, the length 76 may typically be a few hundred meters. In both cases thicknesses 74A and 74B are determined by the angle at which plane 71 is cut into preform 60. When fiber 80 is pulled from preform 60 under conditions which cause the cross-sectional shape of the preform to be substantially preserved as the shape of fiber 80, then thicknesses 74A and 74B will remain approximately the same number of core diameters. For example, if thickness 74A is 1 preform core diameter 66 in preform 60, then thickness 74A will be approximately 1 fiber core diameter 86 in fiber 80. Therefore, in the fiber, distance 74 varies from a value shown as 74A to a value shown as 74B. However, the distance 74 may vary slightly from the value expected from the proportions of the preform depending upon the flow of the material during pulling of the fiber.

A fiber may be drawn from a preform and the shape of the preform be preserved as the shape of the fiber. A typical example of conditions under which a fiber may be drawn, and the fiber retain the shape of the preform, are: substrate tube made of substantially pure silica, that is $SiO_2$; the cladding layer made of fluorine-doped silica; the core made of aluminum-doped silica; the tube heated and a fiber pulled at a tension of between 20 grams to 30 grams; the fiber pulled at a rate of approximately 8 to 10 meters per minute; and a preform feed rate adjusted to make a fiber of approximately 110 microns in diameter. The primary factor in specifying the pulling conditions is the pulling tension. If the temperature is raised so that the pulling tension drops to 5 grams, then the preform will be more fluid and the fiber will become rounded with respect to the shape of the preform. If the temperature is lowered so that the pulling tension rises to around 50 grams, then the fiber may break because of the lack of fluidity of the preform in the region of pulling. A satisfactory silica fiber of the shape shown in FIG. 5 may be made when the conditions are maintained with a pulling tension of between 20 grams and 30 grams. The preform core diameter may be adjusted to make a single mode fiber with a fiber core diameter of 3 to 10 microns. Or, alternatively, the fiber core may be adjusted to be up to 50 microns in order to make a multimode fiber. Distance 92 is chosen to provide a predetermined amount of optical signal leakage from fiber core 84 into an adjacent medium. The corners 94, 96 of fiber 60 are typically rounded in comparison with corresponding corners 98, 100 of preform 60. In an alternative embodiment, the cladding 82 need not be a separate layer as shown in FIG. 3, but may be the substrate tube itself so long as the core and cladding indices are appropriate for the guiding of light. Guiding of the optical wave is achieved by the difference in index of refraction between the core and the doped substrate.

The core may be exposed to protrude from the cladding by etching. Referring to FIG. 4, there is shown a cross section which may refer to either a preform or may refer to an optical fiber pulled from the preform. For example, a preform may be cut as shown in FIG. 5. The cut preform may then be etched in a selective etchant which removes the cladding and the substrate more rapidly than it removes the core. In the example in which the substrate is removed more rapidly than the cladding, the preform will have the cross section shown in FIG. 4. The substrate 81 is etched away more the cladding 82 as shown by step 81A. The cladding 82 is etched away more rapidly than the core 84 as shown at step 82A. Core 84 remains substantially circular in cross section and protrudes from the cladding because the etchant removes core material more slowly than either cladding 82 or substrate 81. A fiber may be pulled from the preform and preserve the cross-sectional shape shown in FIG. 4. A fiber with a protruding core as shown in FIG. 4 is particularly useful in coupling an optical signal guided by the fiber into or out of a liquid. For example, the optical signal may be coupled into a liquid containing laser dye for the purpose of amplifying the optical signal. See Ippen et al., "Evanescent Field Pumped Dye Lasers", *Applied Physics Letters*, Vol. 21, No. 7, p. 301, October 1972.

An advantage of etching the preform and then pulling the fiber is that surface roughness introduced by etching is smoothed out by the pulling step. Etching a glass surface typically produces an undesirable pitting and roughening of the surface. When glass with such a pitted and roughened surface is heated so that it becomes soft, and is then pulled into a fiber, the rough surface is smoothed. It is desirable to have smooth surfaces in an optical fiber in order to prevent light scattering.

Alternatively, a fiber may be pulled from a cut preform and have a cross section as shown in FIG. 3. The fiber may then be selectively etched in order to provide a cross section as shown in FIG. 4. For example, it has been found that a fiber which is pulled to have a cross section as shown in FIG. 3 and which has the compositions: a substantially pure substrate 81 of silica, $SiO_2$; a cladding of weakly phosphorus-doped silica with less than 0.01% mole percent of $P_2O_3$; and core of germanium-doped silica with a $\Delta N/N$ of approximately 0.0059; may be etched using an etchant of commercially available buffered HF into a shape as shown in FIG. 4. Before etching, the fiber had a profile as shown in FIG. 3. As etching proceeds, distance 92 becomes smaller. Tests of coupling the fiber to a liquid containing laser dye indicated increased coupling as distance 92 became less. Coupling of a protruding core fiber as shown in FIG. 4 had even greater coupling to the liquid containing laser dye.

In an alternative example, a protruding core fiber may be made by etching a groove 99 into a preform, as shown in FIG. 5 and FIG. 6. Groove 99 may be etched by first covering plane 71 with a photoresist, photochemically removing the photoresist from the area of groove 99, and exposing the preform to a selective etchant. The etchant removes the substrate and cladding more rapidly than the core, leaving a region of protruding core along the length 99A to 99B of groove 99. A preform in which a groove 99 is etched could typically have the cut made with thickness 74A substantially equal to thickness 74B. A fiber pulled from a preform with a groove 99 etched therein has the advantage that it can be butt-coupled to another optical element at a point along its length where the core does not protrude. And the fiber may be advantageously coupled to a liquid at a region in which the core does protrude. As an example of typical dimensions of fiber which can be made using an etched groove preform, if the preform has a 10 millimeter outside diameter and the fiber has a 100 micron diameter, then a groove length, between 99A and 99B, of 1 millimeter pulls into approximately 10 meters of fiber; and a groove with length 99A, 99B of 10 microns pulls into approximately 10 cm of fiber. Thus, by etching a series of parallel grooves (not shown) similar to groove 99, it is possible to make a production run of optical fibers which can butt-couple to an optical element and have a protruding core region.

Figure 7:
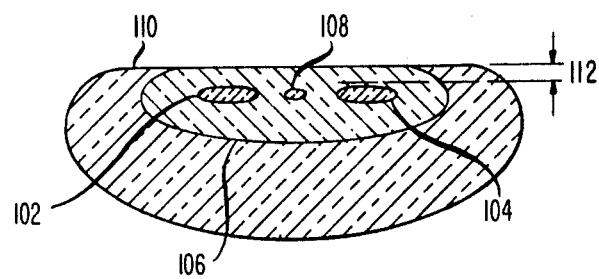
FIG. 7 shows a cross section of a preform including stress lobes.

Alternatively, a birefringent fiber may be made using a cut preform. For example, a single mode birefringent fiber may be made by including stress producing structures such as stress lobes in the preform. The preform may be made by methods known in the art, and disclosed for example in the references Simpson et al., "Single Polarization Fiber", *IEEE Journal of Lightwave Technology*, Vol. 1, Issue 2, page 370, 1983, and by Birch et al., "Fabrication of Polarisation-Maintaining Fibres Using Gas Phase Etching", *Electronics Letters*, Vol. 18, p. 1036, 1982. The preform may be cut along a line which is close to the stress lobes. A fiber with stress lobes may then be pulled from the cut preform. Referring to FIG. 7, there is shown a cross section of a fiber with stress lobes 102, 104. A cladding layer 106 surrounds core 108 and stress lobes 102, 104. Cut 110 provides a thinned cladding layer. The thickness of cladding layer 112 measured along the radius drawn perpendicular to cut 110 may be adjusted to a predetermined value. The preform may be cut in a plane which intersects the axis of the core at an extended point (not shown) as illustrated in FIG. 5.

It is to be understood that the above-described embodiments are simply illustrative of the principles of the invention. Various other modifications and changes may be made by those skilled in the art which will embody the principles of the invention and fall within the spirit and scope thereof. For example, a preform may have a cross section which is circular, or alternatively, the cross section may deviate freom a circular shape in order to achieve desired properties in the optical fiber. All variations of shape of preform cross section and all variations in shape of the optical fiber cross section fall within the spirit and scope of the present invention.

What is claimed is:

1. A method for making an optical fiber comprising the steps of:
   (a) making a preform, the preform having a length, an axis, a core, at least one cladding layer surrounding the core, a major surface enveloping the core and the cladding layer, and, at any point along the length of the preform, a predetermined distance between the core and the major surface;
   (b) preparing said preform by removing a segment of said preform, thereby producing a first preform surface, extending generally lengthwise for at least part of the length of the prepared preform, with the distance between the core and the first surface at any point along the first surface being less than the predetermined distance at that point; and
   (c) drawing an optical fiber from said prepared preform using a draw tension selected to result in the optical fiber having a cross section that is of substantially the same shape as the cross section of the prepared preform.

2. The method for making an optical fiber as claimed in claim 1 further comprising;
   etching said optical fiber so that said cladding is made thinner in order to adjust a minimum thickness of said cladding to a predetermined value.

3. The method for making an optical fiber as claimed in claim 1 further comprising:
   etching said optical fiber using a material selective etch so that said cladding is substantially removed from a portion of said core.

4. The method for making an optical fiber as claimed in claim 1 wherein in step (b) said step of preparing said preform further comprises:
   etching said preform in order to adjust a minimum thickness of said cladding to a predetermined value.

5. The method for making an optical fiber as claimed in claim 1 wherein in step (b) said step of preparing said preform further comprises:
   etching, using a material selective etch, said preform so that at least one cladding layer etches faster than the core layer in order that said at least one cladding layer is removed from a portion of said core.

6. The method for making an optical fiber as claimed in claim 1 wherein said preform has stress lobes for making a birefringent optical fiber.

7. Method of claim 1, wherein the first surface is substantially parallel with the axis of the preform.

8. Method of claim 1, wherein the draw tension is greater than 5 grams and less than 50 grams.

9. A method for making an optical fiber comprising the steps of:
   (a) making a preform of substantially circular cross section, the preform having a length, a core and at least one cladding layer;
   (b) preparing said preform by removing a segment of said preform so that the cross section of the prepared preform has, over at least a portion of the length, a boundary comprising a substantially circular arc and a chord drawn between the endpoints of said arc, with the cross section containing the core; and
   (c) drawing an optical fiber from said prepared preform using a draw tension selected such that the optical fiber has a cross section that is of substantially the same shape as the cross section of the prepared preform.

10. A method for making an optical fiber comprising the steps of:
    (a) making a preform, the preform having a length, an axis, a core, at least one cladding layer surrounding the core, a major surface enveloping the core and the cladding layer, and, at any point along the length of the preform, a predetermined distance between the core and the major surface;

(b) preparing said preform by removing a segment of said preform, thereby producing a first preform surface, extending generally lengthwise for at least part of the length of the prepared preform, with the distance between the core and the first surface at any point along the first surface being less than the predetermined distance at that point; and (c) drawing an optical fiber from said prepared preform; the method further comprising (d) contacting, prior to step (c), a part of the first surface with an etching medium, whereby at least one groove is etched into the prepared preform, the groove oriented substantially transversely to the axis of the prepared preform.

11. Method of claim 10, wherein a multiplicity of substantially parallel grooves are etched into the preform.

12. A method for making an optical fiber, the method comprising the steps of:

(a) making a preform, the preform having a length, an axis, a core, at least one cladding layer surrounding the core, a major surface enveloping the core and the cladding layer, and, at any point along the length of the preform, a predetermined distance between the core and the major surface;

(b) preparing the preform by removing a segment of the preform, thereby producing a first preform surface, extending generally lengthwise for at least part of the length of the prepared preform, with the distance between the core and the first surface at any point along the first surface being less than the predetermined distance at that point, the first surface being inclined with respect to the axis of the preform; and (c) drawing an optical fiber from the prepared preform.

13. An optical fiber comprising a core having a circumference and at least one cladding layer contactingly surrounding the core, at least a part of the optical fiber being an exposed core optical fiber wherein the cladding layer partially surrounds the core, and wherein in the exposed core part of the optical fiber the cladding layer has a cross section with an outer boundary comprising an arcuate first portion and two second portions, each second portion extending from an endpoint of the arcuate first portion substantially to the core, and wherein the exposed portion of the core extends above the second portions of the outer boundary of the cladding cross section.

14. Optical fiber of claim 13, the fiber produced by a process comprising an etching step wherein the part of the fiber is contacted with a medium which etches the cladding layer material at a faster rate than it etches the core material.

15. Optical fiber of claim 13, the fiber further comprising a support layer partially surrounding the cladding layer.

16. Fiber of claim 13, wherein at least about half of the circumference of the core is exposed.

* * * * *